Dec. 1, 1970  S. MANJIKIAN  3,544,358
PRODUCTION OF SEMIPERMEABLE MEMBRANES DIRECTLY ON THE
SURFACES OF PERMEABLE SUPPORT BODIES
Filed July 18, 1966  2 Sheets-Sheet 1
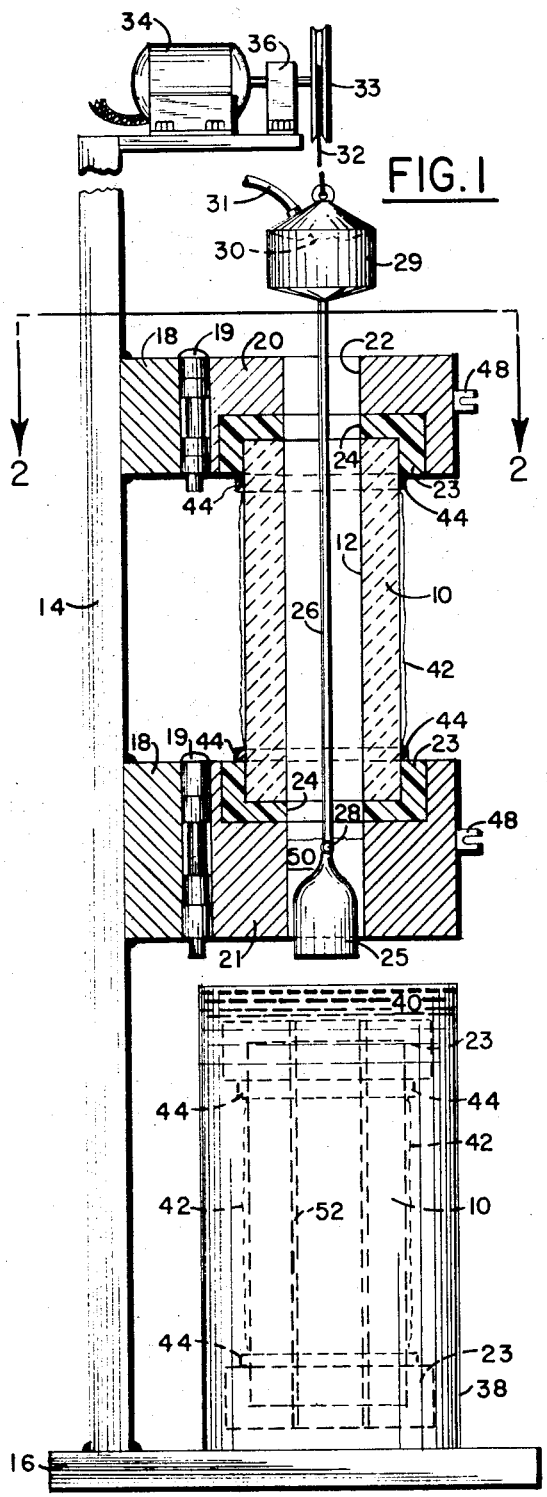
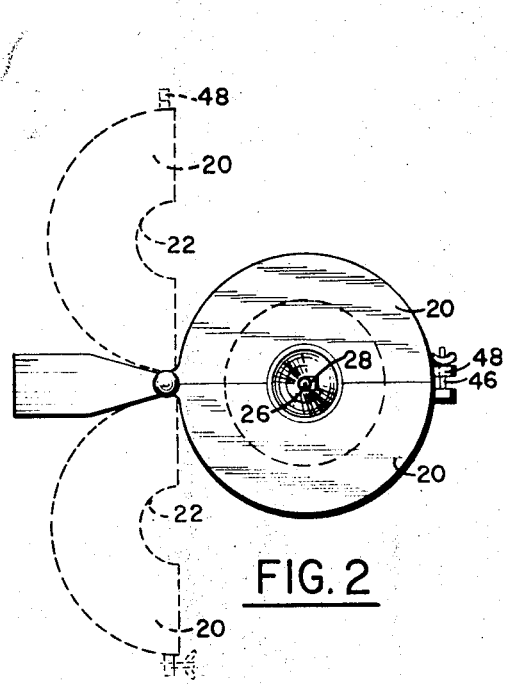
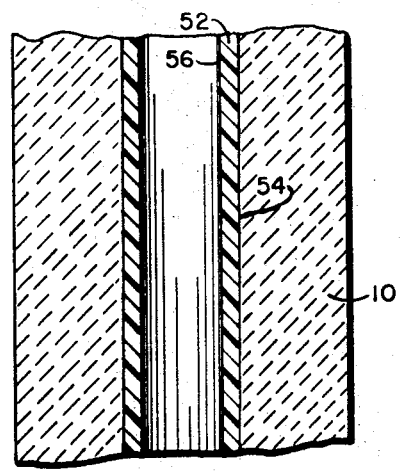
INVENTOR.
Serop Manjikian
BY
Agent

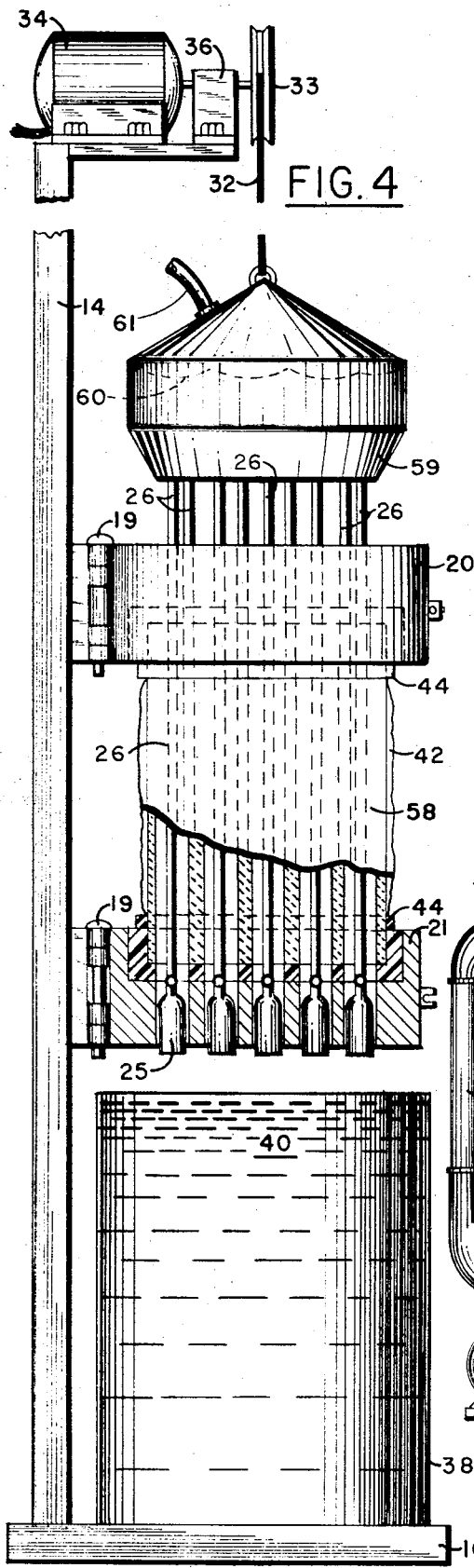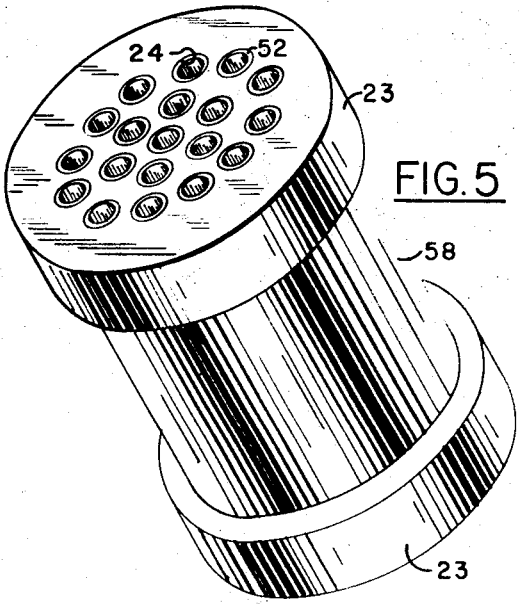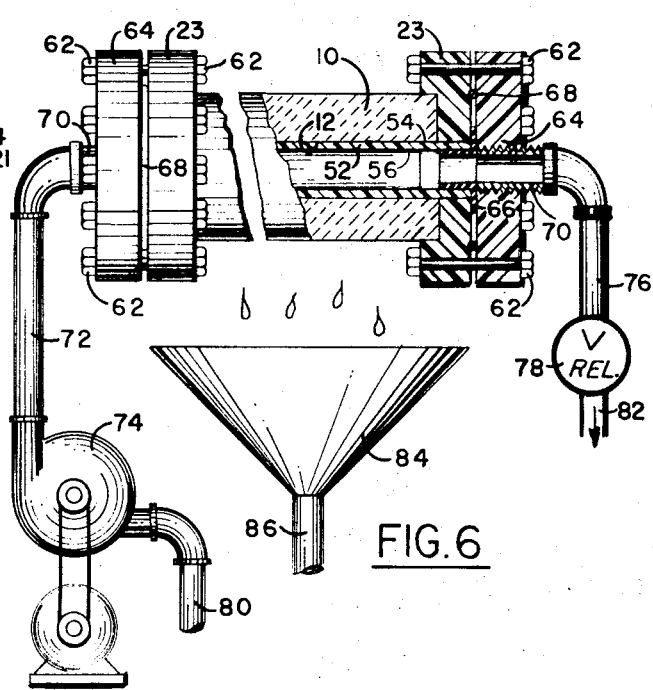

United States Patent Office 3,544,358
Patented Dec. 1, 1970

3,544,358
PRODUCTION OF SEMIPERMEABLE MEMBRANES DIRECTLY ON THE SURFACES OF PERMEABLE SUPPORT BODIES
Serop Manjikian, Del Mar, Calif., assignor to Universal Water Corporation, Del Mar, Calif., a corporation of California
Filed July 18, 1966, Ser. No. 565,761
Int. Cl. B44d 1/44
U.S. Cl. 117—63                                    7 Claims

ABSTRACT OF THE DISCLOSURE

A semipermeable membrane, suitable for use in reverse osmosis process, is produced directly on the surfaces of a semipermeable support body by first spreading a membrane forming composition containing at least one water soluble constituent to form a film on the surface of the porous body. Water is then applied to only the surface of the film remote from the permeable body supporting surface.

---

This invention relates to membranes and particularly to semipermeable membranes useful in treatment of solutions by reverse osmosis.

Semipermeable membranes, to be useful for reverse osmosis, must be capable of passing desired liquids or solutions and holding back salts and solutes which it is desired to separate. At the same time, such membranes must be capable of accomplishing such separation or concentration at high flux. In other words, the membrane must be capable of highly selective separation of solution constituents and yet pass liquid of low solute concentration at high flow rates. Such characteristics of the membrane are dependent on the nature of the film-forming composition from which it is produced and on the method of forming such composition into the desired film to act as a membrane.

Pressure is required to provide the driving force for reverse osmosis. A feed solution is forced through a system including a semipermeable membrane at hyperatmospheric pressure, often the order of a number of hundred pounds per square inch. Purified solution passes through the membrane while its solute content is held back in the more concentrated stream passed through the system. The membrane itself, however, is relatively delicate and must be supported to withstand the hydraulic pressure applied. Moreover, such support must be permeable or porous and contain passages for flow of liquid passing through the membrane. In order to provide such support and liquid transfer, semipermeable membranes have often heretofore been supported first by a porous fabric, such as nylon cloth, and this backed up by a stainless steel member having spaced holes drilled through its surface that supports the fabric and the membrane. Thus a tubular semipermeable membrane may be first encased in a wrapping of nylon cloth, and then the wrapped tube inserted in a stainless steel outer tube having, for example $\frac{1}{32}''$ holes drilled in its wall, spaced about 2 inches apart. The nylon fabric supports the tubular membrane and provides porosity for lateral flow or fluid under the membrane tube to the drilled holes in the steel outer tube.

Such an assembly provides a semipermeable membrane which will be effective in reverse osmosis apparatus, but it suffers from several disadvantages. The membrane must be cast and formed as a separate operation, then removed from its casting plate or tube mold and wrapped or backed by porous fabric and then arranged in proper position in relation to the steel or other strong backing. This requires fine control of casting techniques so that the membrane will fit properly, particularly if it is of tubular shape, and involves tedious wrapping and a difficult insertion into the steel backing tube. Such an arrangement involves therefore an assembly composed of three elements; namely, the membrane, the fabric, and the backing, all of which must be carefully prepared and assembled to provide a properly operating unit.

Reverse osmosis systems often involve a number of units connected in series or in parallel to provide adequate membrane area and capacity. Simplicity of design and reduction of constituent elements to the least number necessary is of substantial commercial importance.

An additional disadvantage of the assembly described above is its cost. The fabric wrapping, often nylon, is an expense and the stainless backing tube (or plate in a flat assembly) is expensive and costly to drill and machine.

My invention solves the problem by a simple, inexpensive yet effective membrane assembly for reverse osmosis apparatus. It provides a membrane of excellent selectivity and flux, supported directly on a surface of a permeable supporting body and eliminates the need for fabric wrapping of a membrane tube, or fabric sheet interlayers. It also eliminates the need for inexpensive stainless steel backing tubes or plates and the accompanying cost of drilling and machining these.

Summarized briefly, my invention contemplates producing a semipermeable membrane directly on a supporting surface of a permeable supporting body. This is accomplished by spreading a membrane-forming composition containing at lease one water soluble constituent over such a supporting body surface to provide a film of substantially uniform thickness. Water is applied to only the surface of the film remote from the supporting surface to remove water soluble constituents. The resulting membrane is directly supported by the permeable body surface being uniformly conforming to said surface. The so-produced semipermeable membrane is effectively employed in apparatus which comprises the semipermeable membrane having one face supported by the surface of the permeable body, and enclosure means for supplying solution to be treated at hyperatmospheric pressure to the other face of said membrane. Means are provided to release a portion of the solution containing an increased concentration of solute from said enclosure, and to collect solution which has passed through the membrane and the permeable body and which contains a reduced concentration of the solute.

In the drawings:

FIG. 1 illustrates a method embodying features of this invention by which membrane-forming composition is spread over a permeable supporting surface and then immersed in water. It shows a central vertical section of apparatus conveniently employed.

FIG. 2 shows a horizontal cross-section of the apparatus of FIG. 1 taken along the line 2—2.

FIG. 3 shows, relatively greatly enlarged, a vertical cross-sectional view of a portion of a semipermeable membrane uniformly conforming to and directly supported by a surface of a permeable body of preferred type.

FIG. 4 illustrates a modification of the operation of the process of this invention in which membrane-forming composition is spread over the interior surfaces of a plurality of bores in a permeable body. The view is partly broken out.

FIG. 5 shows a perspective view of an advantageous type of permeable body having a plurality of bores to support semipermeable membrane tubes.

FIG. 6 shows, in part diagrammatically, a reverse osmosis system containing apparatus embodying features of this invention.

The permeable body on which the semipermeable membrane is directly supported, according to this invention, may be of any convenient configuration suitable for the type of apparatus in which it is employed. Preferably the body is of cylindrical form containing a tubular bore or a plurality of tubular bores containing membrane tubes as disclosed and claimed in copending application Ser. No. 516,977 filed Dec. 28, 1965, now Pat No. 3,392,840 and in which I am joint inventor with George B. Clark. The term "permeable" is used in its more specific meaning embracing a body having liquid carrying channels, pores, or interspaces throughout its mass and more or less uniformly distributed there through. Thus a pervious ceramic structure, or pervious composition of glass or other filler or strengthener and plastic or resin, could be used as a body and could be sufficiently permeable to provide adequate transudation of liquid passing through the membrane. A metal backing tube drilled at intervals is not considered permeable in the sense that this term is used herein, since an intermediate porous linear must be employed to provide lateral flow to each drilled hole, whereas employment of a porous body of more or less continuous porosity and therefore being permeable, according to this invention, eliminates the need for such porous lining.

The membrane-forming composition comprises a cellulosic derivative, a solvent and a modifying agent. The cellulosic derivative employed in the membrane-forming composition has the general formula

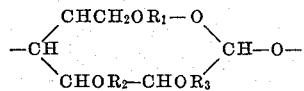

in which $R_1$, $R_2$ and $R_3$ are members of a group consisting of $R_4$ and $CR_5O$ in which $R_4$ is an alkyl group containing 1 to 8 carbon atoms and $R_5$ is an alkyl group containing 1 to 7 carbon atoms.

The solvent employed in the membrane-forming composition is preferably organic and must be capable of dissolving the cellulosic derivative and be miscible with the modifying agent. It should also be miscible with water and should not be chemically reactive with other components of the membrane-forming composition. Preferably it should leach out of the membrane film at a faster rate than the modifying agent. The following agents will be found to have properties making them useful as solvents according to this invention: acetic acid, acetone, dimethylformamide, dimethyl acetoacetamide, dimethyl sulphoxide, dioxane, methyl pyrrolidone, tetrahydrofuran, and triethylphosphate.

The modifying agent employed in the membrane-forming composition of this invention could be characterized as the flux inducing component. The nature of its action is not precisely known, but its effect is to substantially increase the permeability of the membrane, that is, its capacity to pass solution or flux while maintaining desired selectivity in retaining salts or solutes that it is desired to concentrate and separate. Suitable modifying agents include magnesium perchlorate, sodium salycilate and formamide.

The film producing constituent of the membrane-forming composition is the cellulosic derivative, the solvent provides castable compositions and the modifying agent promotes formation of a membrane having desirable flux or liquid flow-through characteristics. Cellulose acetate is preferred as the cellulosic derivative, acetone as the solvent, and formamide as a modifying agent. A preferred membrane-forming composition consists essentially of cellulose acetate, 15 to 30 parts by weight; acetone, 40 to 70 parts by weight; and formamide 15 to 30 parts by weight. At least one constituent of the membrane-forming composition is to be water soluble. In the preferred composition, above, both acetone and formamide are water soluble constituents.

Referring now to the drawings, FIG. 1 illustrates a more specific embodiment of the operation of the method of this invention. In FIG. 1 is shown a cylindrical body 10, fabricated of permeable material such as ceramic or pottery as hereinafter described in more detail. Body 10 is provided with a longitudinal bore 12.

Upright post 14 is fixedly attached to base 16 and to which are attached horizontal brackets 18. Hingedly attached to brackets 18 as at 19 are upper clamp members 20 and lower clamp members 21 which are provided with semicircular central cut-outs 22 which, when these clamps are closed, as in FIG. 1, form central bores aligned with and corresponding in diameter to bore 11 in body 10, and in effect form bore extensions above and below bore 12. Internally, clamping members 20 and 21 are constructed to also mate with and surround flanges 23 which are fixedly attached by a strong adhesive at the end portions of body 10 with bores 24 coaxial with bore 12 as shown, as well as with bore 22. Inside and at the bottom of the lowest extension of the bore in body 10 is a bob 25, which is of outside diameter sufficiently smaller than the interior diameter of bore 12 that it will spread a film of membrane-forming composition of required thickness over the interior surface of bore 12. Bob 25 is supported by tube 26 fabricated of material which is to some extent flexible or resilient, such as plastic or fiberglass, and which is provided with an orifice 28 near its bottom to meter or supply membrane-forming composition into the space above bob 25. The upper end of tube 26 is attached to and communicates with membrane-forming composition supply tank 29, fitted with internal diaphragm 30 and air supply connection 31. Tank 29 is in turn supported by cable 32 wound over drum 33. Motor 34 and connected reduction gear 36 drive drum 32 at desired speed to pull bob 25 up through bores 12 and 24 and the extension thereof formed by the central cut-outs 22 in upper clamp members 20.

Also supported by base 16 is water tank 38 of dimensions to be able to submerge a body 10 when dropped into water 40 contained in it.

In order to waterproof the outside surface of body 10, it is enclosed in a loose tube 42 of water impervious plastic film, such as of polyvinyl chloride or polyethylene, which is sealed top and bottom around body 10 just inside the shoulders formed by flanges 23 by tightly encircling tensioned rubber bands 44. All other surfaces of body 10, except that which will be covered by the membrane film will be waterproofed and protected by contiguous surfaces of flanges 23 which are adhesively bonded thereto and in sealing engagement therewith.

Clamp members 20 and 21 are designed to firmly clamp around body flanges 23 and are maintained in closed clamping position by pivoted catches 46 which engage slots in members 48 fixed to adjacent mating clamp members 20 and 21, and into which they are tightened by wing nuts 49.

As an example of the operation of the method of this invention, a body 10 having bore 12, with flanges 23 firmly affixed at each end, is placed in position as shown in clamping members 20 and 21 which are tightened firmly around flanges 23 by engaging catches 46 in members 48 and tightening wing nuts 49. Then a bob 25 is chosen to outside diameter about 0.01 to 0.03 inch smaller than the internal diameter of bore 12 in body 10. This will provide sufficient clearance to result in spreading a film of desired thickness, that is between about 0.005 and about 0.015 inch thick. Bob 25 is arranged at the bottom of the lower extension of bore 12 (formed by cut-outs 22 in clamp members 21) substantially as shown in FIG. 1. Then membrane-forming composition, which will be a relatively viscous liquid, is placed in tank 29 and forced by air pressure from line 31 applied to diaphragm 30 which causes the composition to flow down tube 26 and out orifice 28 to be retained in bore 24 above bob 25 as seen at 50. A metered amount is forced down tube 26 to sufficiently provide for producing the desired membrane film and this can conveniently be arranged for applying air pressure to diaphragm 30 for a predetermined period of time. Motor 34 is then actuated and working through gear reducer 36 rotates drum 33 to wind up cable 32 and thus pull bob 25 upward through bore 24 and bore 12. As it rises, it spreads a thin, uniform film 52 of membrane-forming composition on the surface of bores 12 and 24, as will be seen in FIG. 3. This film will extend over the surface of bores 12 and 24 and also over the surfaces of the bore extensions formed by cut-outs 22 in clamp members 20 and 21. After the film has been formed, catches 46 are loosened and clamping members 20 and 21 are opened. Preferably the lower catch is released first and members 21 swing open, the body 10 meanwhile being held by the upper pair of clamping members 20. Then the upper catch is loosened and the top clamping members 20 are opened allowing the body 10 to fall into water 40 in tank 38, substantially as shown in dotted lines in FIG. 1. The clamping members 20 when opened are shown in dotted lines in FIG. 2. As clamping members 20 and 21 are opened, the portion of the film adhering to their inner surfaces is broken away from that lining the surface of bore 24 so that the body 10 as dropped into the water 40 has its bore 12 and flange bores 24 effectively lined with membrane-forming composition. It is preferred to immerse the membrane film in water as soon as possible after formation on the permeable body surface.

After an hour or so, or longer, immersion in the water 40 in tank 38, body 10 with flanges 23 and membrane 52 adhering to the inner surface of the bores 12 and 24 is removed from tank 38 to be assembled in apparatus for use in water or solution treating.

Referring now to FIG. 3, here is shown, much enlarged, a section of a portion of a semipermeable membrane produced directly on a supporting body surface. The membrane 52 is shown in adherent relationship with surface 54 of permeable body 10. It is postulated that some amount of membrane-forming composition clinging to the surface 54 of body 10 provides the adhesion; but, whether the effect is mechanical or due to some other type of bonding, adhesion is sufficient to tightly bond the membrane and the permeable body 10 together. The membrane 52 after water immersion treatment will be characterized by one face (that to which water was applied) comprising a thin semipermeable surface layer 56, the remainder of the thickness of the membrane 52 including its other face adhering to permeable body surface 54, that is the surface of bore 12, being relatively permeable. If desired, after the membrane has been formed, and water soluble constituents removed, it may be cured at elevated temperatures to improve its semipermeability characteristics. This may conveniently be accomplished by treatment with water at elevated temperature of between about 65° F. and 180° F. for a period of more than 5 minutes. Sheet membranes may be cured prior to assembly in a reverse osmosis system; tubular membranes are best cured by passing warm or hot water through an assembled unit under pressure. The higher the curing temperature the more selective will the membrane become, but this is accompanied by some loss of flow-through or flux.

Preferably the surface of body 10 to which the semipermeable membrane 52 adheres and is supported, is of finer texture and is characterized by smaller pores than the interior mass of said body 10. This provides a relatively smooth skin or surface to support the membrane evenly and uniformly, and at the same time provides best flow-through characteristics. It will be appreciated by those skilled in the art that such a surface, even though of fine texture and having small pores, will not unduly affect flow-through since it is very thin. The remainder of the body being of substantial thickness for required strength needs greater permeability for effective flux characteristics. Such a permeable body structure may be obtained by extrusion of a ceramic composition in which a suitable mixture of clays, fillers, and other constituents, as hereinafter described in more detail, is forced through a die to produce the required body configuration which is then fired. This may desirably take the form of a cylinder having a central bore on whose interior surface the semipermeable membrane is supported. A particularly advantageous body form is shown in FIG. 5 in which a cylindrical body 58 is provided with a plurality of tubular bores, each of which can be lined with an adherent semipermeable membrane 52, according to this invention.

Apparently, movement of the mix over the die elements causes the smooth textured inner surface which is important in providing an efficient supporting structure, but whatever the mechanism responsible, extrusion does provide the type of body structure and surface described. Porosity and permeability in the supporting body may be obtained by any suitable method, depending on the body material. For a permeable ceramic body this may be accomplished by including some pulverized combustible material in the mix so that when the body is formed and then fired, the combustible constituent will burn out, leaving a porous structure. Preferably the porous body is characterized by a surface having uniformly spaced pores of between about 0.0005 and 0.001 inch diameter. In the body mass, an average pore diameter between 0.0015 and 0.0045 inch, with the body having an overall porosity of from about 30% to 60% voids by volume, has been found effective. Such characteristics may be obtained by using a mix comprising from 50% to 70% of various clays including from about 20% to about 40% ball clay, from about 8% to about 15% nepheline syenite and from 30% to 60% of finely divided combustible organic material. These ingredients are well mixed with sufficient water to form composition of extrudable consistency. A suitable die is employed to produce the extrusion. The green extrusion is dried and then fired, raising the temperature slowly to burn off the organic constituent to form the pores, and subsequently held at proper high temperature to obtain the permeable ceramic body.

A permeable body having an advantageous combination of permeability, surface texture and strength may be prepared by extruding and firing a mixture of the following; the types of clays being identified by specific designations:

| | Percent by weight |
|---|---|
| 6–200 clay | About 12 |
| Lincoln clay (4–6) | do 12 |
| Kentucky special ball clay | do 12 |
| Old Mine No. 4 ball clay | do 12 |
| Nepheline syenite | do 12 |
| —60° plus 200 mesh ground walnut shells | do 40 |

The above ingredients are admixed with about 25% of water to form a heavy mixture suitable for extrustion and this is forced through a suitable die. The green extrusion is then dried at about 150° F. and then fired in a kiln with the temperature slowly raised to about 1200° F. and held at about this temperature until the walnut shell component of the mixture has been completely burned out and the body has been decarbonized and degassed. The temperature is then raised to about cone 5 for finish firing. The so produced ceramic body will be characterized by the desirable fixed textured surface and required permeability. The process for producing such ceramic bodies is more particularly described and claimed in copending patent application Ser. No. 592,764 filed Nov. 8, 1966 in which I am inventor with Albert L. Bennett.

In FIG. 4 is shown apparatus for producing semipermeable membranes directly supported on the inner surfaces of a plurality of tubular bores in a cylindrical permeable body. Operation is similar to that described with reference to FIG. 1 except that a plurality of bobs 25 and tubes 26 are employed, one being located in each bore 12 and 24 in body 58. An upper membrane-forming mixture receptacle or supply tank 59 with internal diaphragm 60 and air pressure connection 61, is arranged to supply the mixture in metered amounts to each of the plurality of tubes 26, by the same procedure previously described. Bobs 25 are drawn simultaneously through bores 12 and 24 to produce the membrane films on the inner walls thereof. After formation of the films, body 58 is dropped into water 40 in container 38 as previously described, with the outer surface of body 58 being protected from contact with the water by polyethylene tube 42 held in place by rubber bands 44. After removal of water soluble constituents, body 58 is taken out of water 40 and tube 42 and rubber bands 44 removed. The body with membranes in place is then ready for curing and assembly in apparatus for treating a solution by reverse osmosis.

For simplicity and ease of understanding, reverse osmosis apparatus embodying the membrane of this invention directly supported on a permeable body surface, is illustrated in FIG. 6, showing a single bore 12 in a permeable body 10.

Referring now to FIG. 6, a ceramic permeable body 10 is shown with flanges 23 bonded by epoxy cement to its ends, and with central bore 12 extending also into bores 24 in flanges 23. Lining bore 12 and also extending into flange bores 24 is semipermeable membrane 52 characterized by one face comprising a thin semipermeable surface layer 56 and being supported by its other face directly on the surface of bore 12. Attached to flanges 23 as by bolts 62 are end plates 64 which are provided with bores in communication with bores 24 in flanges 23. Sealing end plates 64 to flanges 23 and also preventing leakage of feed solution past the membrane ends are resilient angle rings 66. Additional gasketing between end plates 64 and flanges 23 may be provided by O-rings 68.

Threaded into end plates 64 and communicating with the bores therein are nipples 70 which connect on the input side, through pipe 72 to pump 74, and on the output side through pipe 76 to pressure relief valve 78. Solution to be purified, such as brackish water, is introduced through pipe 80 and is pumped through the system at high pressure being exhausted as solution more concentrated in brackish water contaminants through pressure relief valve 78 and out pipe 82. Solution under pressure passing through membrane lined bore 12 results in reverse osmosis and passage of purified solution through membrane 52 and through permeable body 10. The purified solution dripping off body 10 is collected in container or funnel 84 and this product may be drawn off through product pipe 86. As an example of operation of such a system, brackish water containing 1,000 parts per million of dissolved solids and particulate matter is treated in a limited capacity unit. This solution is introduced into pump 74 through pipe 80 at a rate of 200 gallons per day and pressure raised to 250 pounds per square inch. Flow through the system is arranged by adjustment of pressure relief valve 78 to discharge 150 gallons per day while retaining 250 pounds per square inch in the system. The outflow from pipe 82 contains 1200 p.p.m. of salts and particulate matter, while the purified water collected in container 84 at the rate of 50 gallons per day contains about 400 p.p.m. of dissolved solids and is soft, since hardening salts will have been removed and free from particulate matter, and suitable for laboratory use.

The ceramic body described in the embodiment illustrated in FIG. 6 can be sufficiently strong to withstand pressures required for reverse osmosis of relatively dilute solutions such as brackish water at low flow rates. For conditions requiring higher pressures, it will be appreciated that stronger materials will be required for body 10, or its strength may be bolstered by wrapping or sheathing with suitably strong reinforcing materials such as glass fiber, or other reinforcing wrapping.

Applying water only to the exposed face of the membrane film to remove water soluble constituents during formation is an important feature of the method of this invention. As has previously been indicated, the membrane is formed with one face as a thin surface layer which is semipermeable, while the rest of the thickness of the membrane is permeable. It is considered that its face, that is the surface which has been contacted by the water, is the functioning face which is responsible for selective action and separation of soluble salts or solutes from liquid in the solution being treated. Protecting the other face of the membrane film (the face supported by the surface of the permeable body) from initial contact with water provides a membrane with only the one semipermeable face as described, and this is on its surface remote from the porous supporting body surface. If water were allowed to contact the back face, or that in contact with the supporting surface, then this might also be converted into a semipermeable skin and thus adversely affect the flux or flow-through characteristics of the membrane. Additionally, keeping the water away from the back face maintains the membrane in close adherent relationship to the supporting body surface, so that the membrane may be uniformly supported to prevent possible rupture under pressure and also to maintain good flow characteristics from the semipermeable face of the membrane through its thickness and through the permeable supporting body.

The method for producing a semipermeable membrane, according to this invention, can be carried out at normal room temperature and no special temperature control is required during the operation. The whole operation is carried out at ambient temperature with only the temperature of the water for immersion being controlled within the described limits.

It is to be understood that the critical nature of the contact of water to only the surface of the membrane film which is remote from the supporting surface applies only to the steps involved in formation of the membrane. After the water soluble membrane-forming constituent has been removed or leached out, and the membrane has been formed and set, then both of its faces may be immersed in water without any further change in its structure or effective function. In fact, as is well known, after formation membranes must be kept wet in order to preserve their efficiency.

The method of this invention provides a strong, efficient membrane and support structure useful for obtaining improved performance in a reverse osmosis system, while maintaining excellent membrane selectivity and water flux. This is accomplished without the need for an intermediate fabric layer to provide lateral flow to backing member holes.

The membrane produced will be about one-half as thick as the thickness of the film of composition from which it is formed. Apparently the film material shrinks during processing, particularly the water treatment step, so that preferred thickness of the membrane formed on and supported by the permeable body surface is between about 0.002 and about 0.008 inch.

I claim:

1. A method for producing a semipermeable membrane directly on a supporting surface of a permeable body which comprises:
(a) spreading a semipermeable membrane-forming composition consisting essentially of; a substantially water-insoluble, film-forming cellulosic derivative, a solvent for said cellulosic derivative selected from the group consisting of acetic acid, acetone, dimethyl formamide, dimethyl acetoacetamide, dimethyl sulphoxide, dioxane, methyl pyrollidone, tetrahydrofuran, and triethyl phosphate; and a modifying agent selected from the group consisting of magnesium perchlorate, salycilic acid, and formamide; said solvent and said modifying agent being water soluble; on said supporting surface of said body to provide a film thereon of said membrane-forming composition of substantially uniform thickness; and
(b) applying water to only the face of said film remote from said supporting surface of said body in amount sufficient to remove water-soluble constituents from said film.

2. A method according to claim 1 in which said membrane forming composition in step (a) consists essentially of cellulose acetate, acetone and formamide.

3. A method according to claim 1 in which the thickness of said film in step (a) is between about 0.005 and about 0.015 inch.

4. A method according to claim 1 in which water-soluble constituents of said film are removed in step (b) by immersing in water only the face of said film remote from the said supporting surface of said body.

5. A method according to claim 1 in which water-soluble constituents of said film are removed in step (b) by immersing said film in water while protecting from initial contact with said water all areas of said permeable body surfaces not covered by said film.

6. A method according to claim 1 in which the water-soluble constituents of said film are removed in step (b) by immersing in water the face of said film remote from said supporting surface of said body while protecting from initial contact with said water the face of said film adjacent to said supporting surface.

7. A method according to claim 1 in which the formation of said film in step (a) and the application of water thereto to remove water-soluble constituents therefrom in step (b) is substantially instantaneous.

References Cited

UNITED STATES PATENTS

| 3,446,359 | 5/1969 | Loeb et al. | 210—321 X |
| 3,457,170 | 7/1969 | Havens | 210—23 |
| 2,944,294 | 7/1960 | Bourbeau et al. | 117—63 |
| 3,000,757 | 9/1961 | Johnston et al. | 117—63 |
| 3,043,713 | 7/1962 | Boyer | 117—62 |
| 3,100,721 | 8/1963 | Holden | 117—63 X |
| 3,133,132 | 5/1964 | Loeb et al. | 264—49 |
| 3,156,645 | 11/1964 | Chapin et al. | 210—321 X |
| 3,170,867 | 2/1965 | Loeb et al. | 264—41 X |
| 3,190,766 | 6/1965 | Yuan | 117—63 |
| 3,208,875 | 9/1965 | Holden | 117—63 X |
| 3,332,815 | 7/1967 | Havens | 156—175 |
| 3,341,024 | 9/1967 | Lowe et al. | 210—490 |

FOREIGN PATENTS

| 295,120 | 4/1965 | Netherlands. |

OTHER REFERENCES

Havens Industries, Sea Water Conversion, March 1964, pp. 1–10.

WILLIAM D. MARTIN, Primary Examiner

M. R. LUSIGNAN, Assistant Examiner

U.S. Cl. X.R.

117—97, 98, 123, 166; 210—321, 490; 264—41, 49